(12) United States Patent
Seto (10) Patent No.: US 8,214,525 B2
(45) Date of Patent: Jul. 3, 2012

(54) ADDRESSES ASSIGNMENT FOR ADAPTOR INTERFACES

(75) Inventor: Pak-Lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/351,777

(22) Filed: Jan. 9, 2009

(65) Prior Publication Data

US 2009/0119413 A1    May 7, 2009

Related U.S. Application Data

(63) Continuation of application No. 10/742,302, filed on Dec. 18, 2003, now Pat. No. 7,502,865.

(51) Int. Cl.
   *G06F 15/173* (2006.01)
(52) U.S. Cl. ............... 709/238; 709/245; 709/250
(58) Field of Classification Search .............. 709/238, 709/245, 250
   See application file for complete search history.

(56) References Cited

U.S. PATENT DOCUMENTS

| | | | |
|---|---|---|---|
| 5,706,440 A | 1/1998 | Compliment et al. | |
| 6,038,400 A | 3/2000 | Bell et al. | |
| 6,061,349 A * | 5/2000 | Coile et al. | 370/389 |
| 6,351,375 B1 | 2/2002 | Hsieh et al. | |
| 6,553,005 B1 * | 4/2003 | Skirmont et al. | 370/285 |
| 6,928,478 B1 * | 8/2005 | Gangadharan | 709/226 |
| 7,155,546 B2 | 12/2006 | Seto | |
| 7,376,147 B2 | 5/2008 | Seto et al. | |
| 2003/0076788 A1 | 4/2003 | Grabauskas et al. | |
| 2003/0184902 A1 | 10/2003 | Thiesfeld | |
| 2003/0210688 A1 * | 11/2003 | Basso et al. | 370/389 |
| 2004/0054866 A1 * | 3/2004 | Blumenau et al. | 711/202 |
| 2005/0138154 A1 | 6/2005 | Seto | |
| 2005/0138221 A1 | 6/2005 | Marushak | |
| 2005/0163123 A1 * | 7/2005 | Gangadharan | 370/392 |
| 2005/0185599 A1 | 8/2005 | Clayton | |
| 2006/0101130 A1 * | 5/2006 | Adams et al. | 709/218 |

FOREIGN PATENT DOCUMENTS

| | | |
|---|---|---|
| EP | 1363429 A2 | 11/2003 |
| GB | 2354137 A1 | 3/2001 |
| WO | 2005/064897 A2 | 7/2005 |
| WO | 2005/064897 A3 | 7/2005 |

OTHER PUBLICATIONS

Steven Fairchild, "Expander Configuration Details," T10 Technical Committee memorandum, document ID XP-002327110; Sep. 17, 2002, 45 pp.
International Search Report and Written Opinion for Patent Application No. PCT/US2005/002990, mailed May 17, 2005.
International Search Report and Written Opinion for Patent Application No. PCT/US2004/040418, mailed Apr. 29, 2005.

(Continued)

*Primary Examiner* — Mohamed Wasel
(74) *Attorney, Agent, or Firm* — Caroline M. Fleming (57) ABSTRACT

An initial configuration is maintained assigning multiple local interfaces to one initial local address. For each local interface, a remote address of a remote interface on at least one remote device to which the local interface connects is received. The initial local address is used to identify the local interfaces assigned to the initial local address in response to receiving a same remote address for each remote interface connected to the local interfaces assigned the initial local address.

20 Claims, 8 Drawing Sheets

OTHER PUBLICATIONS

American National Standard for Information Technology—Serial Attached SCSI (SAS) American National Standard, XX, XX, vol. 376-2003, Nov. 11, 2003.
PCT/US2004/040138 International Search Report & Written Opinion mailed Sep. 23, 2005.
First Office Action, Apr. 4, 2008, for CN 200480036848.4, 20 pp.
American National Standards Institute, "Fiber Channel Arbitrated Loop (FC-AL-2)", American National Standard for Information Technology, 1999, pp. i-v & 1-16.
American National Standards Institute, "Fiber Channel-Framing and Signaling (FC-FS)", American National Standard for Information Technology, Revision 1.80, Apr. 9, 2003, pp. i-xlvi & 1-18.
K-P. Deyring, "Serial ATA: High Speed Serialized AT Attachment", Jan. 7, 2003, Revision 1.0a, pp. 1-22.
R.C. Elliot, (Ed.), "Information Technology—SCSI Enclosure Services-2 (SES-2)", Project T10/1559-D, Jul. 15, 2003, Revision 4, pp. i-xiv & 1-79.
R.C. Elliot, (Ed.), "Information Technology—Serial Attached SCSI (SAS)", Project T10/1562-D, Jul. 9, 2003, Revision 5, pp. i-xxxii & 1-432.
R.C. Elliot, "Serial Attached SCSI Architecture", Sep. 2003, pp. 1-46.
Steven Fairchild, "Expander Configuration Details", T10 Document 02-359, Sep. 9, 2002, pp. 1-17.
Steven Fairchild, "SAS Expander Initiator Based Configuration", Jul. 12, 2002, pp. 1-32.
IEEE Computer Society, "Part 3: Carrier Sense Multiple Access With Collision Detection (CSMA/CS) Access Method and Physical Layer Specification", IEEE Standard for Information Technology 802.3, 2002, pp. 1-32.
P.T. McLean, (Ed.), "Information Technology—AT Attachment with Packet Interface-6 (ATA/ATAPI-6)", T13/1410D, Feb. 26, 2002, Revision 3B, pp. 1-56.
PCI Special Interest Group, "PCI Local Bus Specification", Mar. 29, 2002, Revision 2.3, pp. i-xiv & 1-6.
Phillips Semiconductors, "The I-C Bus Specification", Jan. 200, Version 2.1, pp. 1-46.
Qlogic Corporation, "Enclosure Management Controller for Serial ATA", Gen424 Data Sheet, 2001, pp. 1-4.
Second Office Action, Sep. 19, 2008, for CN200480036848.4, 8 pp.
Second Office Action, May 5, 2008, for EP04812611.4-2212, 5 pp.
Official Letter, Mar. 20, 2006, for ROC Application No. 93137188, 1 pp. [translation].
International Preliminary Report on Patentability (IPER), Jun. 29, 2006, for PCT/US2004/040138, 9 pp.
First Office Action, Apr. 4, 2008, for CN 200480036848.4, 19 pp. [translation].
EP Office Action, May 11, 2007, for EP Application No. 04 812 611.4-2212, 6 pp.
Office Action received for Chinese Patent Divisional Application No. 200910266849.2, mailed on Jul. 26, 2011, 6 pages of English Translation only.
Office Action received for Chinese Patent Application No. 200480036848.4, Mailed on Feb. 5, 2010, pp. 13 including English translation.
Office Action received for Chinese Patent Application No. 200480036848.4, Mailed on Aug. 28, 2009, pp. 9 including English translation.
Office Action received for Chinese Patent Application No. 200480036848.4, Mailed on Feb. 20, 2009, pp. 12 including English translation.

* cited by examiner

ADDRESSES ASSIGNMENT FOR ADAPTOR INTERFACES

RELATED APPLICATIONS

This patent application is a continuation of U.S. patent application Ser. No. 10/742,302, filed on Dec. 18, 2003, which patent application is incorporated herein by reference in its entirety.

BACKGROUND

1. Field

The embodiments relate to addresses assignment for adaptor interfaces.

2. Description of the Related Art

An adaptor or multi-channel protocol controller enables a device coupled to the adaptor to communicate with one or more connected end devices over a physical cable or line according to a storage interconnect architecture, also known as a hardware interface, where a storage interconnect architecture defines a standard way to communicate and recognize such communications, such as Serial Attached Small Computer System Interface (SCSI) (SAS), Serial Advanced Technology Attachment (SATA), etc. These storage interconnect architectures allow a device to maintain one or more connections, such as direct point-to-point connections with end devices or connections extending through one or more expanders. Devices may also interconnect through a switch, an expander, a Fibre Channel arbitrated loop, fabric, etc. In the SAS/SATA architecture, a SAS port is comprised of one or more SAS PHYs, where each SAS PHY interfaces a physical layer, i.e., the physical interface or connection, and a SAS link layer having multiple protocol link layer. Communications from the SAS PHYs in a port is processed by the transport layers for that port. There is one transport layer for each SAS port to interface with each type of application layer supported by the port. A "PHY" as defined in the SAS protocol is a device object that is used to interface to other devices and a physical interface. Further details on the SAS architecture for devices and expanders is described in the technology specification "Information Technology—Serial Attached SCSI (SAS)", reference no. ISO/IEC 14776-150: 200x and ANSI INCITS.***:200x PHY layer (Jul. 9, 2003), published by ANSI; details on the Fibre Channel architecture are described in the technology specification "Fibre Channel Framing and Signaling Interface", document no. ISO/IEC AWI 14165-25; details on the SATA architecture are described in the technology specification "Serial ATA: High Speed Serialized AT Attachment" Rev. 1.0A (January 2003).

Within an adaptor, the PHY layer may include the parallel-to-serial converter to perform the serial to parallel conversion of data, so that parallel data is transmitted to layers above the PHY layer, and serial data is transmitted from the PHY layer through the physical interface to the PHY layer of a receiving device. In the SAS specification, there is one set of link layers for each SAS PHY layer, so that effectively each link layer protocol engine is coupled to a parallel-to-serial converter in the PHY layer. The physical interfaces for PHYs on different devices may connect through a cable or through a path etched on the circuit board to connect through a circuit board path.

As mentioned, a port contains one or more PHYs. Ports in a device are associated with physical PHYs based on the configuration that occurs during an identification sequence. A port is assigned one or more PHYs within a device for those PHYs within that device that are configured to use the same SAS address within a SAS domain during the identification sequence, where PHYs on a device having the same SAS address in one port connects to PHYs on a remote device that also use the same SAS address within a SAS domain. A wide port has multiple interfaces, or PHYs and a narrow port has only one PHY. A wide link comprises the set of physical links that connect the PHYs of a wide port to the corresponding PHYs in the corresponding remote wide port and a narrow link is the physical link that attaches a narrow port to a corresponding remote narrow port. Further details on the SAS architecture is described in the technology specification "Information Technology—Serial Attached SCSI (SAS)", reference no. ISO/IEC 14776-150:200x and ANSI INCITS.***:200x PHY layer (Jul. 9, 2003), published by ANSI.

BRIEF DESCRIPTION OF THE DRAWINGS

Referring now to the drawings in which like reference numbers represent corresponding parts throughout:

FIGS. 1 and 2 illustrate a system and adaptor in accordance with embodiments;

FIGS. 3, 5*a*, 5*b*, and 7 illustrate how devices may connect in accordance with embodiments; and FIGS. 4 and 6 illustrate operations to perform an identification sequence between connected devices in accordance with embodiments.

DETAILED DESCRIPTION

In the following description, reference is made to the accompanying drawings which form a part hereof and which illustrate several embodiments. It is understood that other embodiments may be utilized and structural and operational changes may be made.

FIG. 1 illustrates a computing environment in which embodiments may be implemented. A host system 2 includes one or more central processing units (CPU) 4 (only one is shown), a volatile memory 6, non-volatile storage 8, an operating system 10, and adaptors 12*a*, 12*b* which includes physical interfaces to connect with remote deices, comprising end devices, switches, expanders, storage devices, servers, etc. An application program 16 further executes in memory 6 and is capable of transmitting and receiving transmissions via one of the adaptors 12*a*, 12*b*. The host 2 may comprise any computing device known in the art, such as a mainframe, server, personal computer, workstation, laptop, handheld computer, telephony device, network appliance, virtualization device, storage controller, etc. Various CPUs 4 and operating system 10 known in the art may be used. Programs and data in memory 6 may be swapped into storage 8 as part of memory management operations.

The operating system 10 may load a device driver 20*a* and 20*b* for each storage interface supported in the adaptor 12 to enable communication with a device communicating using the same supported storage interface and also load a bus interface 24, such as a Peripheral Component Interconnect (PCI) interface, to enable communication with a bus 26. Further details of PCI interface are described in the publication "PCI Local Bus, Rev. 2.3", published by the PCI-SIG. The operating system 10 may load device drivers 20*a* and 20*b* supported by the adaptors 12*a*, 12*b* upon detecting the presence of the adaptors 12*a*, 12*b*, which may occur during initialization or dynamically. In the embodiment of FIG. 1, the operating system 10 loads three device drivers 20*a* and 20*b*. For instance, the device drivers 20*a* and 20*b* may support the SAS and SATA storage interfaces, i.e., interconnect architectures. Additional or fewer device drivers may be loaded based on the number of storage interfaces the adaptors 12a and 12b supports.

Figure 1:
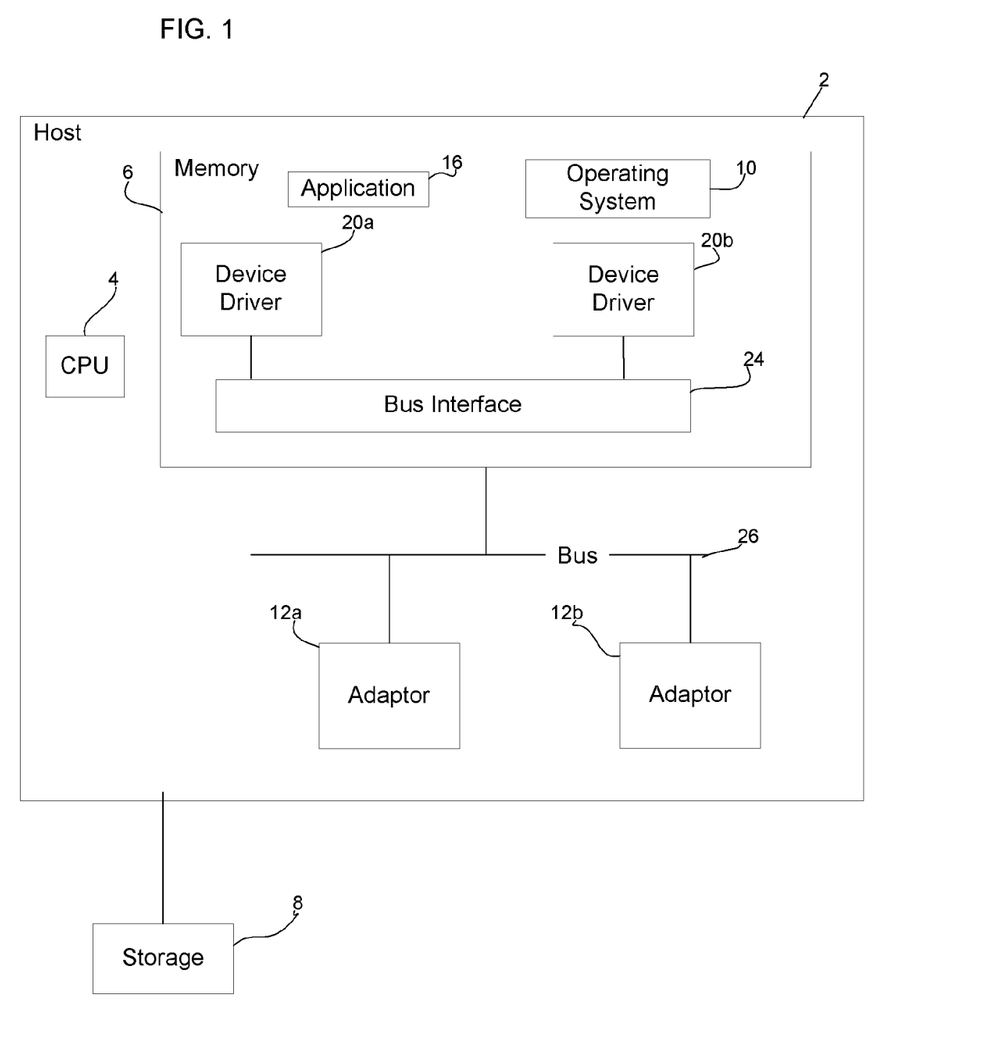
Figure 2:
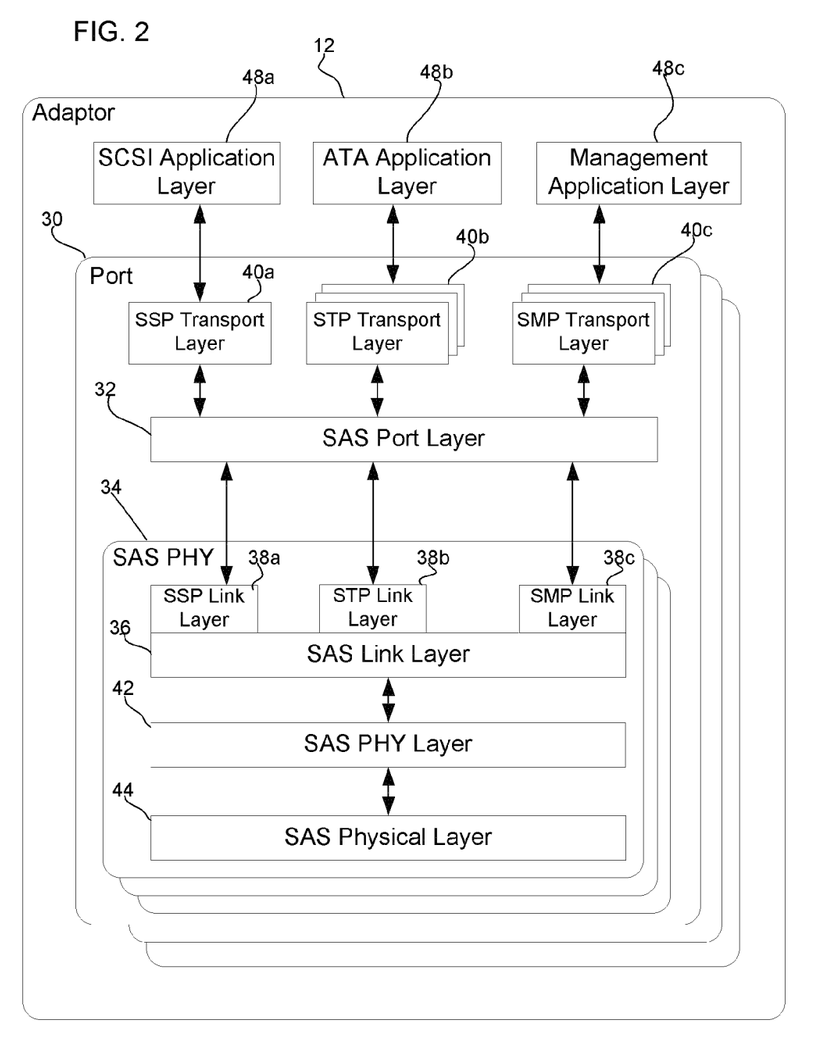

FIG. 2 illustrates an embodiment of an adaptor 12, which may comprise the adaptors 12a, 12b. Each adaptor includes one or more ports 30, where each port 30 contains a port layer 32 that interfaces with one or more SAS PHYs 34. Each PHY includes a SAS link layer 36 having one or more protocol link layers. FIG. 2 shows three protocol link layers, including a Serial SCSI Protocol (SSP) link layer 38a to process SSP frames, a Serial Tunneling Protocol. (STP) layer 38b, a Serial Management Protocol (SMP) layer 38c, which in turn interface through port layer 32 with their respective transport layers, a SSP transport layer 40a, a STP transport layer 40b, and an SMP transport layer 40c. The layers may be implemented as program components executed from memory and/or implemented in hardware.

Each PHY 34 for port 30 further includes a SAS PHY layer 42 and a physical layer 44. The physical layer 44 comprises the physical interface, including the transmitter and receiver circuitry, paths, and connectors. As shown, the physical layer 44 is coupled to the PHY layer 42, where the PHY layer 42 provides for an encoding scheme, such as 8b10b to translate bits, and a clocking mechanism. The PHY layer 32a, 32b ... 32n may include a serial-to-parallel converter to perform the serial-to-parallel conversion and a phased lock loop (PLL) to track the incoming data and provide the data clock of the incoming data to the serial-to-parallel converter to use when performing the conversion. Data is received at the adaptor 12 in a serial format, and is converted at the SAS PHY layer 32a, 32b ... 32n to the parallel format for transmission within the adaptor 12. The SAS PHY layer 42 further provides for error detection, bit shift and amplitude reduction, and the out-of-band (OOB) signaling to establish an operational link with another SAS PHY in another device, speed negotiation with the PHY in the external device transmitting data to adaptor 12, etc.

In the embodiment of FIG. 2, there is one protocol transport layer 40a, 40b, and 40c to interface with each type of application layer 48a, 48b, 48c in the application layer 50. The application layer 50 may be supported in the adaptor 12 or host system 2 and provides network services to the end users. For instance, the SSP transport layer 46a interfaces with a SCSI application layer 48a, the STP transport layer 46c interfaces with an Advanced Technology Attachment (ATA) application layer 48b, and the SMP transport layer 46d interfaces with a management application layer 48c. Further details on the operations of the physical layer, PHY layer, link layer, port layer, transport layer, and application layer and components implementing such layers described herein are found in the technology specification "Information Technology—Serial Attached SCSI (SAS)". Further details of the ATA technology are described in the publication "Information Technology—AT Attachment with Packet Interface-6 (ATA/ATAPI-6)", reference no. ANSI INCITS 361-2002 (September, 2002).

Each port 30 has a unique SAS address across adaptors 12 and each PHY 34 within the port has a unique identifier within the adaptor 12 for management functions and routing. An adaptor 12 may further have one or more unique domain addresses, where different ports in an adaptor 12 can be organized into different domains or devices. The SAS address of a PHY may comprise the SAS address of the port to which the PHY is assigned and that port SAS address is used to identify and address the PHY to external devices in a SAS domain.

Figure 3:
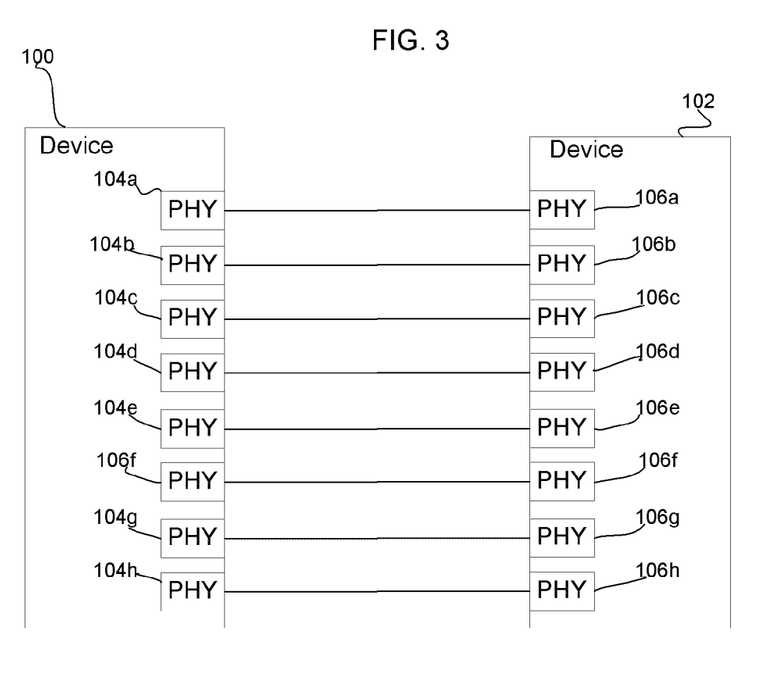

FIG. 3 illustrates an example of how devices 100 and 102 may interface, where the device 100 has eight PHYs 104a, 104b ... 104j linked to eight PHYs 106a, 106b ... 106j, respectively, at the device 104. The devices 100 and 102 may comprise a host, expander, storage device, server, etc., where the devices may implement the architecture described with respect to FIG. 2 These devices 100 and 102 may have an initial address configuration for their PHYs, where the PHYs may share the same port address and be in the same domain. The initial address configuration for the PHYs in a device is based on user configuration selections.

Figure 4:
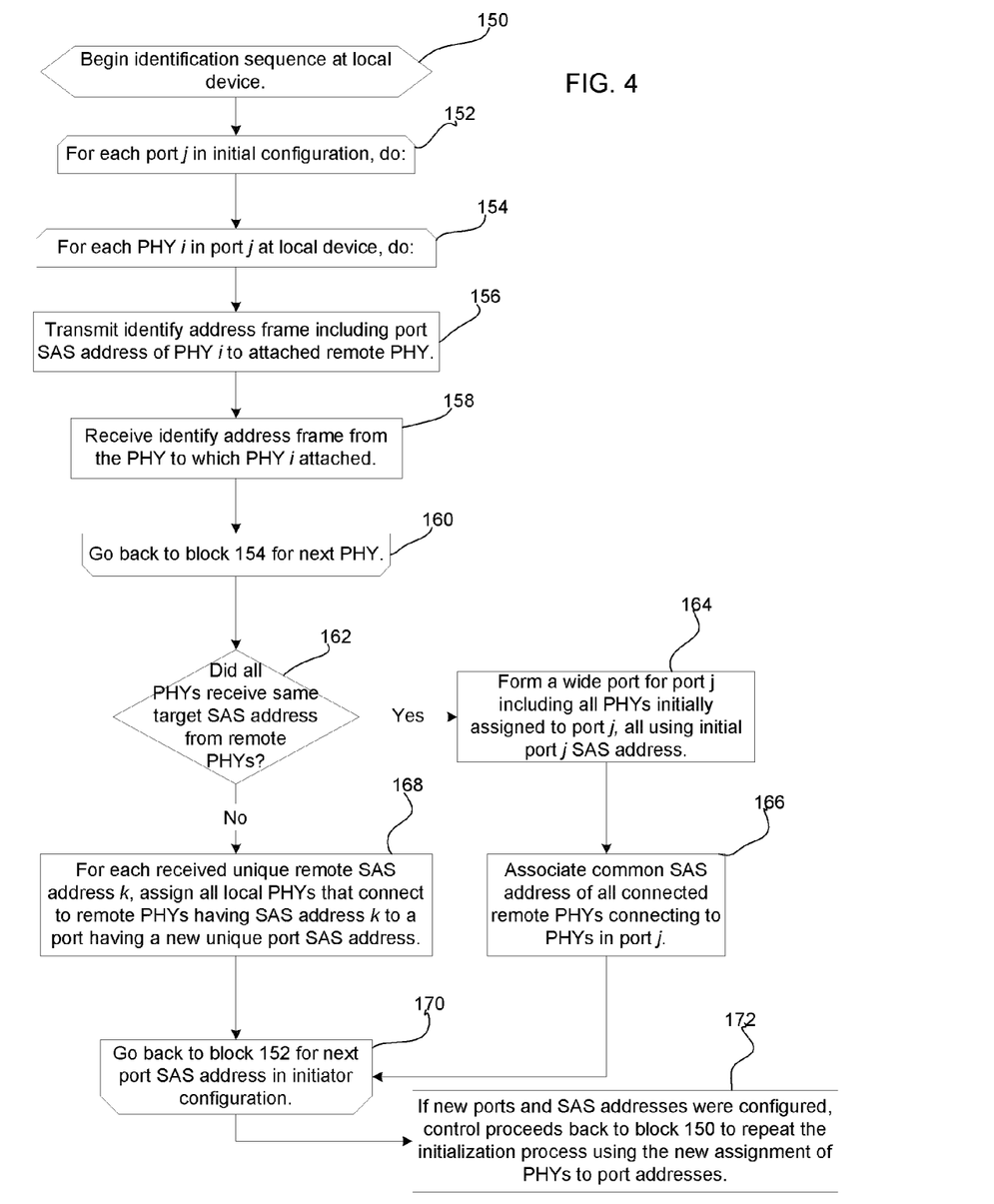

FIG. 4 illustrates operations implemented in a device implementing the architecture of FIG. 2, such as adaptor 12 devices 100 and 102, to perform the identification sequence and configure the PHYs within ports. During the identification sequence, a device is informed of the address of remote interfaces, e.g., remote PHYs, connected to the local interfaces, e.g., local PHYs, of the device. The identification sequence operations in FIG. 4 may be programmed in the port layer 32 of the adaptor 12, devices 100, 102 or performed by a device driver 20a and 20b for the adaptor 12. Upon commencing (at block 150) the identification sequence after a reset or power-on sequence at a device, e.g., 100, a loop is performed at block 152 through 170 for each port j provided in the initial or default configuration maintained at the device, e.g., 100. For each initial port j a loop is performed at blocks 154 through 160 for each PHY i assigned to port j in the initial configuration. At block 156, a device, e.g., 100, transmits identify address information including the SAS address of PHY i, which is the SAS address of port j, to the attached PHY, e.g., 106a, 106b ... 106h in remote device 102. The PHY i further receives (at block 158) the identify address information from the PHY to which PHY i is attached. Device 100 may receive the identification information from the remote device 102 before transmitting identification information, or vice versa. Identification for a PHY is complete when a PHY has transmitted and received identification information. Further, if the device 100 does not receive identification information for the attached device PHY, then a timeout may occur where the entire link initialization process is restarted. Control then proceeds back to block 154 to transmit and receive the identify address information for the next PHY.

After all the PHYs, e.g., 104a, 104b ... 104h, have received the identify address information from the attached PHYs, e.g., 106a, 106b ... 106h, a determination is made (at block 162) whether all the PHYs, e.g., 104a, 104b ... 104h, received the same SAS address from the PHYs to which they connect. If so, then a wide port is formed for port j including all the PHYs, e.g., 104a, 104b ... 104h, initially assigned to port j, so that all are configured to use the initial port j SAS address. The common SAS address of all the remote PHYs, e.g., 106a, 106b ... 106h, is then associated with the common port j SAS address of the local PHYs, e.g., 104a, 104b ... 104h, to use during operations. If (at block 162) the SAS addresses of the remote PHYs 106a, 106b ... 106h are not the same, then for each received unique remote SAS address k, the local PHYs, e.g., 104a, 104b ... 104h, that connect to remote SAS address k are assigned (at block 168) to a newly configured port having a new unique port SAS address. The new unique SAS addresses of the local PHYs may not be the same if the connected remote PHYs were in different remote devices. In certain embodiments, the new unique port SAS addresses may be different than the initial SAS address configured for the port or one port SAS address may be the same as the initial SAS address and the other additional new SAS addresses for the connections to different remote devices may be unique. From block 166 or 168, control proceeds (at block 170) back to block 152 to consider any further ports in the initial configuration. After considering all ports in the initial configuration, if (at block 172) new ports and SAS addresses were configured, control proceeds back to block 150 to perform a second instance of the initialization process using the new assignment of PHYs to port addresses.

The local and remote PHYs comprise local and remote interfaces at the local and remote devices, respectively. An interface is a physical or logical component that is connected to another interface on the same or a different device. The term interface may include interfaces other than PHY interfaces. A wide port comprises a port assigned multiple interfaces, where one or more interfaces may be assigned to a port. A local address, such as the local SAS address, comprises an address or identifier assigned to one or more interfaces and a remote address, such as the remote SAS address, comprises an address or identifier assigned to one or more interfaces in a remote device that connects to another interface, such as one of the local interfaces.

With the operations of FIG. 4, the ports are configured to include the maximum number of PHYs in each new port, where the PHYs in each new port will connect to PHYs in the connected adaptor that have the same SAS address. Further, if the PHYs in an initial port configuration are not connected to PHYs having the same PHY address, then new ports are configured with new SAS addresses to provide new ports, so that the PHYs assigned to the new ports connect to PHYs in the connected adaptors having the same SAS address. Further, after the reconfiguration of the ports, the identification sequence is performed again to perform configuration using the new port configuration.

Figure 5A:
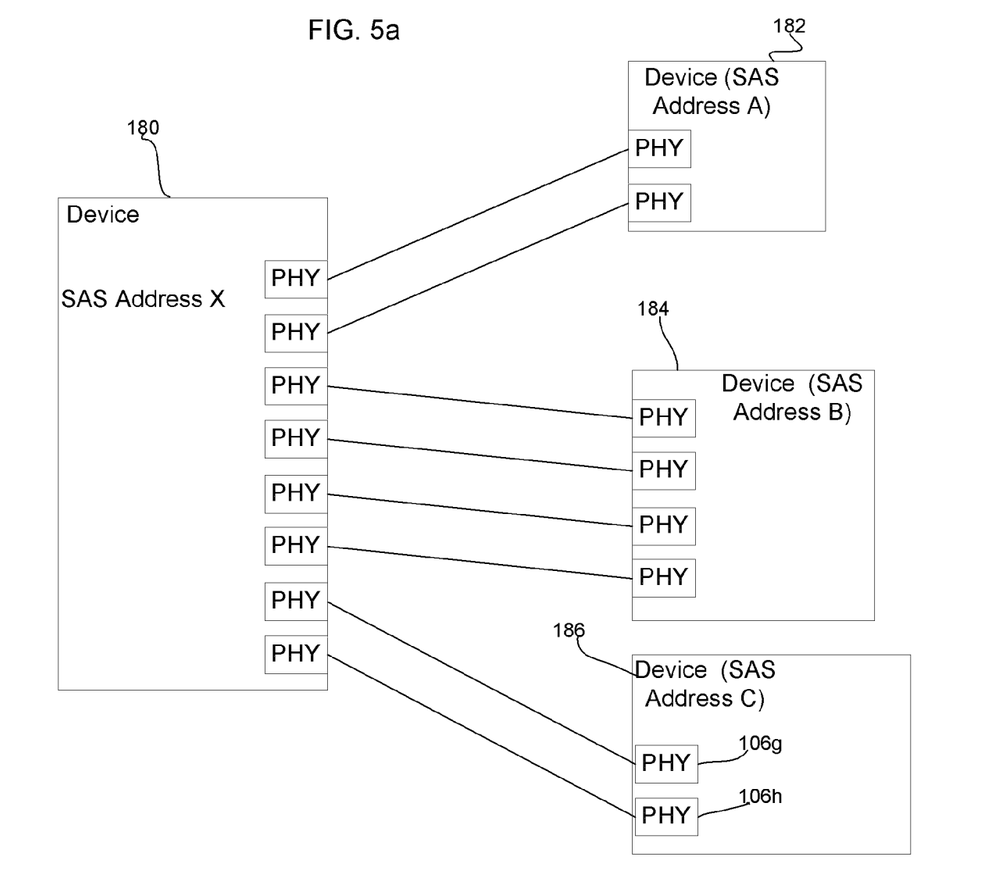
Figure 5B:
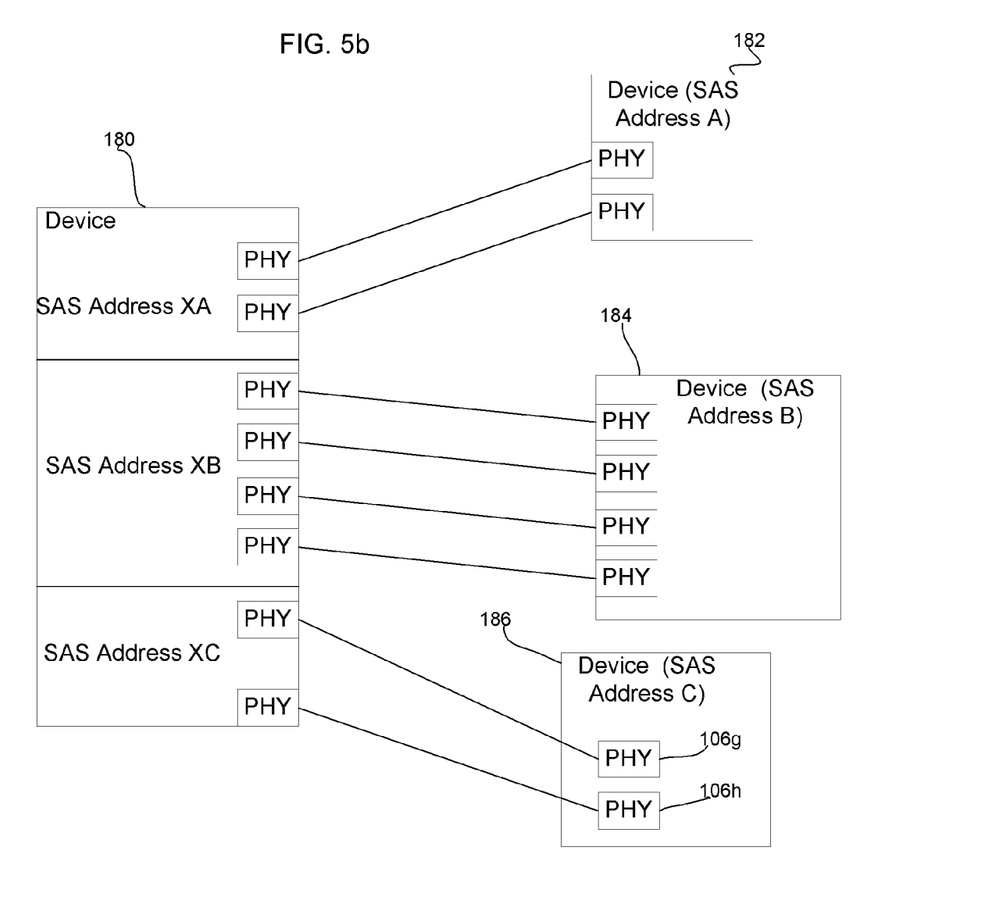

FIG. 5a illustrates an embodiment where the PHYs in the device 180 are configured to have one SAS address "x", which connect to PHYs in three different devices 182, 184, and 186, each having a different SAS address "A", "B", and "C". Performing the operations of FIG. 4 within a device having the configuration of FIG. 5a results in the configuration shown in FIG. 5b, in which adaptor 180 is configured to use three SAS addresses XA, XB, and XC to communicate with the PHYS in devices 182, 184, and 186. Each of the SAS addresses XA, XB, and XC may comprise the address of a different port.

Figure 6:
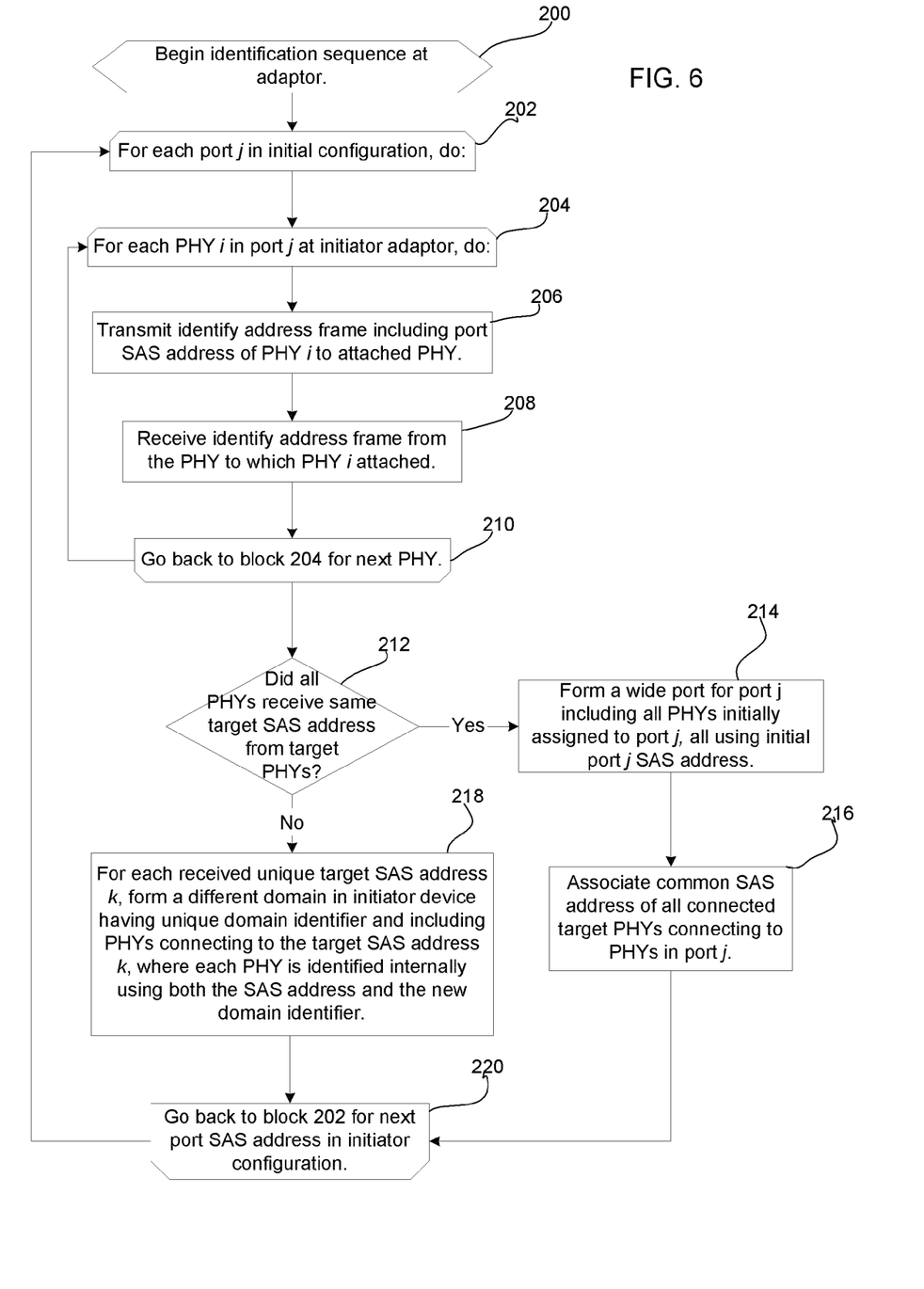

FIG. 6 illustrates an alternative embodiment of operations to perform the identification sequence and establish port configurations. FIG. 6 includes many of the same operations of FIG. 4, with the following exceptions. After determining (at block 212) that the connected PHYs do not return the same address for a port j, instead of configuring new ports with different SAS addresses as done in FIG. 4, at block 218, for each received unique target SAS address k, a different domain is formed in the device 180 having a unique domain identifier. Each PHY is then internally identified using both the SAS address and the newly configured domain identifier. After the domain designation is made, the device, e.g., 100 (FIG.3), does not perform the identification sequence again and instead uses the domain identifier and SAS address to distinguish PHYs having the same address that are connected to different devices. However, external devices 182, 184, 186 may use the same SAS address to address the local PHYs.

Figure 7:
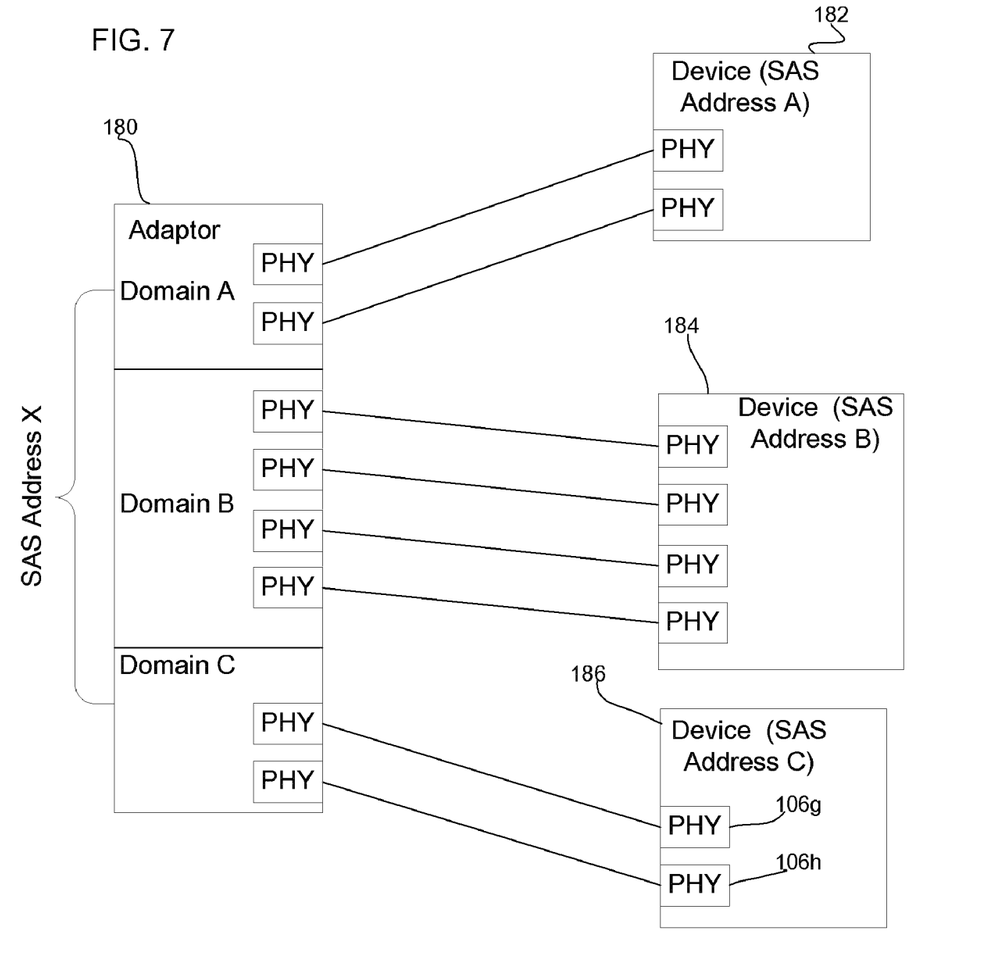

FIG. 7 illustrates an embodiment resulting from performing the operations of FIG. 6 in a device having the configuration shown in FIG. 5a, in which the device, e.g., 100, is configured to use the same SAS address "X" for PHYs connected to different devices 252, 254, and 256, but where those PHYs connected to different addresses are configured in different domains A, B, C. Thus, the device 250 uses the combination of domain identifier and SAS address to distinguish its local PHYs. With the embodiment of FIG. 6, a second identification sequence is not performed, unlike the second identification sequence performed at block 172 in FIG. 4, because there is no alteration of the default port configuration. Instead, the same address "X" is used. Thus, the remote devices 182, 184, 186 (FIG. 7) use the same SAS address to address the different PHYs in device 180 and the device 180 uses the domain addresses A, B, C in combination with the port SAS address "X" to distinguish the local PHYs devices.

The described embodiments provide techniques for assigning PHYs or interfaces to ports when the interfaces receive different SAS addresses from the attached PHYs. The embodiment of FIG. 6 minimizes communication and coordination between the local and remote PHYs, because the initial address configuration is used for interfaces that receive different addresses from the attached device and the device internally distinguishes interfaces connected to different addresses by assigning the interfaces to different domains.

In certain embodiments, the configuration is performed to form ports having a maximum possible width, i.e., maximum number of PHYs/connections. Maximizing the number of PHYs in a port maximizes the throughput for a port. Further, maximizing PHYs maximizes the load balancing opportunities. Yet further, maximizing the number of PHYs and connections at a port increases the number of alternate paths to the port, which minimizes I/O latency. Still further, maximizing the number of PHYs at a port provides redundant connections to allow continued operations should one or more PHYs fail.

Additional Embodiment Details

The described embodiments may be implemented as a method, apparatus or article of manufacture using programming and/or engineering techniques to produce software, firmware, hardware, or any combination thereof The term "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art. Additionally, the devices, adaptors, etc., may be implemented in one or more integrated circuits on the adaptor or on the motherboard.

In the described embodiments, a physical interface was represented by a PHY, providing an interface between the physical connection and other layers within the adaptor. In additional embodiments, the interface representing a physical connection may be implemented using constructs other than a PHY.

Described embodiments utilize the SAS architecture. In alternative embodiments, the described techniques for assigning physical connections to ports may apply to additional storage interfaces.

In the described embodiments, certain operations were described with respect to layers within the device/adaptor architectures. In alternative implementations, the functions described as performed by a certain layer may be performed in a different layer.

In the described embodiments, transmissions are received at a device from a remote device over a connection. In alternative embodiments, the transmitted and received information processed by the transport protocol layer or device driver may be received from a separate process executing in the same computer in which the device driver and transport protocol driver execute.

In certain embodiments, the device driver and network adaptor embodiments may be included in a computer system including a storage controller, such as a SCSI, Redundant Array of Independent Disk (RAID), etc., controller, that manages access to a non-volatile storage device, such as a magnetic disk drive, tape media, optical disk, etc. In alternative implementations, the network adaptor embodiments may be included in a system that does not include a storage controller, such as certain hubs and switches.

In described embodiments, the storage interfaces supported by the adaptors comprised SATA and SAS. In additional embodiments, other storage interfaces may be supported. Additionally, the adaptor was described as supporting certain transport protocols, e.g. SSP, STP, and SMP. In further implementations, the adaptor may support additional transport protocols used for transmissions with the supported storage interfaces. The supported storage interfaces may transmit data at the same link speeds or at different, non-overlapping link speeds. Further, the physical interfaces may have different physical configurations, i.e., the arrangement and number of pins and other physical interconnectors, when the different supported storage interconnect architectures use different physical configurations.

The illustrated operations of FIGS. 4 and 6 show certain events occurring in a certain order. In alternative embodiments, certain operations may be performed in a different order, modified or removed. Moreover, operations may be added to the above described operations and still conform to the described embodiments. Further, operations described herein may occur sequentially or certain operations may be processed in parallel. Yet further, operations may be performed by a single processing unit or by distributed processing units.

The adaptors 12a, 12b may be implemented in a network card, such as a Peripheral Component Interconnect (PCI) card or some other I/O card, or on integrated circuit components mounted on a system motherboard or backplane.

The foregoing description of various embodiments has been presented for the purposes of illustration and description. Many modifications and variations are possible in light of the above teaching.

What is claimed is:

1. A method comprising:
    assigning a same initial local Serial Attached Small Computer Systems Interface (SAS) address to all local SAS PHYs in a local device;
    for multiple ones of the local SAS PHYs, receiving a remote SAS address assigned to a remote SAS PHY in a remote device to which the local SAS PHY connects; and
    configuring width of a local port in the local device based on the received remote SAS address by assigning a same local SAS address to local PHYs that receive a same remote SAS address from the remote SAS PHY.

2. The method of claim 1, wherein the same remote SAS address is received from four remote SAS PHY to form a SAS wide port comprising four SAS PHYs.

3. The method of claim 1, wherien the same remote SAS address is received from all remote SAS PHYs to form a SAS wide port having a maximum possible width.

4. The method of claim 1, wherein the same remote SAS address is received from one of the plurality of remote SAS PHYs to form a SAS narrow port.

5. The method of claim 1, wherein the local device is a host adapter.

6. The method of claim 1, wherein the remote device is a storage device.

7. The method of claim 1, wherein the received remote SAS address is received as part of an identification sequence, further comprising:
    transmitting the initial local SAS address to the remote SAS PHYs connected to the local SAS PHYs.

8. The method of claim 7, wherein the initial SAS address assigned to the local SAS PHYs, including the at least one generated identifier, comprise local SAS addresses, further comprising:
    initiating an additional identification sequence in response to generating the local SAS address; and
    transmitting the local SAS addresses identifying the local SAS PHYs to the connected remote SAS PHYs in response to the additional identification sequence.

9. An apparatus comprising:
    a plurality of local Serial Attached Small Computer Systems Interface (SAS) PHYs in a local device to communicate with a plurality of remote SAS PHYs on at least one remote device; and
    circuitry capable of causing operations, the operations comprising:
    assigning a same initial local Serial Attached Small Computer Systems Interface (SAS) address to all local SAS PHYs in the local device;
    for multiple ones of the local SAS PHYs, receiving a remote SAS address assigned to a remote SAS PHY in the remote device to which the local SAS PHY connects; and
    configuring width of a local port in the local device based on the received remote SAS address by assigning a same local SAS address to local PHYs that receive a same remote SAS address from the remote SAS PHY.

10. The apparatus of claim 9, wherein the same remote SAS address is received from four remote SAS PHY to form a SAS wide port comprising four SAS PHYs.

11. The apparatus of claim 9, wherein the same remote SAS address is received from all remote SAS PHYs to form a SAS wide port having a maximum possible width.

12. The apparatus of claim 9, wherein the same remote SAS address is received from one of the plurality of remote SAS PHYs to form a SAS narrow port.

13. The apparatus of claim 9, wherein the local device is a host adapter.

14. The apparatus of claim 9, wherein the remote device is an expander.

15. The apparatus of claim 9, wherein the remote device is a storage device.

16. The apparatus of claim 9, wherein the received remote SAS address is received as part of an identification sequence, further comprising:
   transmitting the initial local SAS address to the remote SAS PHYs connected to the local SAS PHYs.

17. The apparatus of claim 16, wherein the initial SAS address assigned to the local SAS PHYs, including the at least one generated identifier, comprise local SAS addresses, further comprising:
   initiating an additional identification sequence in response to generating the local SAS address; and
   transmitting the local SAS addresses identifying the local SAS PHYs to the connected remote SAS PHYs in response to the additional identification sequence.

18. An article including a non-transitory computer readable storage medium having associated information, wherein the information, when executed by a processor, results in a machine performing:
   assigning a same initial local Serial Attached Small Computer Systems Interface (SAS) address to all local SAS PHYs in a local device;
   for multiple ones of the local SAS PHYs, receiving a remote SAS address assigned to a remote SAS PHY in a remote device to which the local SAS PHY connects; and
   configuring width of a local port in the local device based on the received remote SAS address by assigning a same local SAS address to local PHYs that receive a same remote SAS address from the remote SAS PHY.

19. The article of claim 18, wherein the received remote SAS address is received as part of an identification sequence, further comprising:
   transmitting the initial local SAS address to the remote SAS PHYs connected to the local SAS PHYs.

20. The article of claim 19, wherein the initial SAS address assigned to the local SAS PHYs, including the at least one generated identifier, comprise local SAS addresses, further comprising:
   initiating an additional identification sequence in response to generating the local SAS address; and
   transmitting the local SAS addresses identifying the local SAS PHYs to the connected remote SAS PHYs in response to the additional identification sequence.

\* \* \* \* \*